US011288581B2

(12) United States Patent
Lang et al.

(10) Patent No.: US 11,288,581 B2
(45) Date of Patent: Mar. 29, 2022

(54) SUBSYMBOLIC ENCODING WITH PRESERVED SEMANTIC RELATIONSHIPS

(71) Applicant: SAP SE, Walldorf (DE)

(72) Inventors: Jana Lang, Palo Alto, CA (US); Matthias Kaiser, Walldorf (DE)

(73) Assignee: SAP SE, Walldorf (DE)

( * ) Notice: Subject to any disclaimer, the term of this patent is extended or adjusted under 35 U.S.C. 154(b) by 1076 days.

(21) Appl. No.: 15/855,109

(22) Filed: Dec. 27, 2017

(65) Prior Publication Data
US 2019/0197412 A1 Jun. 27, 2019

(51) Int. Cl.
*G06N 5/02* (2006.01)
*G06F 16/901* (2019.01)

(52) U.S. Cl.
CPC .......... *G06N 5/02* (2013.01); *G06F 16/9024* (2019.01)

(58) Field of Classification Search
CPC .............................. G06N 5/02; G06F 16/9024
See application file for complete search history.

(56) References Cited

U.S. PATENT DOCUMENTS

| | | | |
|---|---|---|---|
| 7,853,598 B2 | 12/2010 | Transier et al. | |
| 8,548,161 B2* | 10/2013 | Murray | G06F 7/723 380/28 |
| 8,805,808 B2 | 8/2014 | Transier et al. | |
| 8,892,488 B2 | 11/2014 | Qi et al. | |
| 9,176,949 B2 | 11/2015 | Bullock et al. | |
| 9,740,680 B1* | 8/2017 | Mikolov | G06N 20/00 |
| 10,445,356 B1* | 10/2019 | Mugan | G06N 3/084 |
| 2013/0173248 A1* | 7/2013 | Curzi | H03M 7/6088 704/9 |
| 2015/0278268 A1* | 10/2015 | El-Ali | G06F 16/245 707/722 |
| 2015/0281162 A1* | 10/2015 | Shen | G10L 15/1822 709/206 |

(Continued)

OTHER PUBLICATIONS

Lei Wu et al., "Semantics-Preserving Bag-of-Words Models and Applications," IEEE Transactions on Image Processing, 2010, vol. 1, No. 1, pp. 1-12.

(Continued)

*Primary Examiner* — Omar F Fernandez Rivas
*Assistant Examiner* — Tri T Nguyen
(74) *Attorney, Agent, or Firm* — Sterne, Kessler, Goldstein & Fox P.L.L.C.

(57) ABSTRACT

Disclosed herein are system, method, and computer program product embodiments for encoding symbolic data into a subsymbolic format while preserving the semantic arrangement of the symbolic data. In an embodiment, to encode the symbolic data, a subsymbolic encoder system may convert a symbolic graph into a tuple representation having tuple elements corresponding to the nodes of the symbolic graph. The subsymbolic encoder system may retrieve a dictionary identification for each tuple element and calculate a subsymbolic value for each tuple element using an exponential component. The subsymbolic encoder system may standardize the length of the subsymbolic values and/or add a weighted relationship indicator to the subsymbolic values. The subsymbolic encoder system may transmit the subsymbolic values to a subsymbolic intelligence system.

20 Claims, 4 Drawing Sheets

(56) References Cited

U.S. PATENT DOCUMENTS

2016/0371254 A1   12/2016  Yamagami et al.
2017/0011289 A1    1/2017  Gao et al.

OTHER PUBLICATIONS

Rui Lin et al., "Hierarchical Recurrent Neural Network for Document Modeling," Proceedings of the 2015 Conference on Empirical Methods in Natural Language Processing, Sep. 17-21, 2015, Lisbon, Portugal, pp. 899-907.

* cited by examiner

SUBSYMBOLIC ENCODING WITH PRESERVED SEMANTIC RELATIONSHIPS

BACKGROUND

Generally, artificial intelligence (AI) systems may utilize two types of learning methods: symbolic AI and subsymbolic AI. Symbolic AI utilizes symbols or human-readable representations of data. For example, symbolic AI may utilize rules, trees, logical inferences, and/or human language words. In contrast, subsymbolic AI may utilize vector representations of data. These vector representations may utilize bits and may not take a readily human-understandable form. Via the vectorized structure of subsymbolic AI, sub symbolic AI systems may process information at a faster rate compared to symbolic AI systems.

In order to combine both approaches, symbolic data is typically converted into a subsymbolic form. One conversion model is the bag-of-words model. Conversion using the bag-of-words model, however, may cause the loss of syntactic and semantic information often seen in symbolic data. As such, symbolic AI systems are not always able to reproduce the semantic relationships between symbols formatted for utilization by subsymbolic AI systems.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for encoding and/or decoding symbolic data and subsymbolic data.

In an embodiment, a subsymbolic encoder system may convert symbolic data into sub symbolic data in a manner that preserves the syntactical and semantic nature of the symbolic data. In addition to preserving the ordering of elements within the symbolic data, the subsymbolic encoder system may also encode weighted relationships between the elements of the symbolic data.

In an embodiment, the subsymbolic encoder system may receive the symbolic data in the form of a sentence or a sequence of words. For example, the sentence may be, "Solvent company sends reminder to indebted customer." Each word in the sentence may be a symbolic element. The sentence taken as a whole may be a symbolic graph of symbolic elements. To convert the symbolic graph into a subsymbolic format, the subsymbolic encoder system may convert the symbolic textual representation into a numeric and/or vectorized representation. The subsymbolic encoder system may perform this conversion in a manner that allows each word to be separately decodable. In an embodiment, the subsymbolic encoder system may encode the symbolic graph so that the position of each word within the sentence (i.e., the syntactical structure) is reproducible. In an embodiment, this conversion allows for the combination of symbolic and subsymbolic data and/or the processing of symbolic data in a subsymbolic format.

In an embodiment, to perform this conversion, the subsymbolic encoder system may utilize an exponential component. This exponential component may aid in preserving the relationship and/or ordering of the symbolic elements of the graph. Using the previous sentence as an example, the subsymbolic encoder system may convert the sentence from a symbolic graph having text adjacency into a tuple. A tuple may be a computer format for representing the elements of the graph. For example, a tuple representing the previous sentence may be:

<solvent, company, sends, reminder, to, indebted, customer>

In an embodiment, the sentence may be converted into a tuple where nouns are represented as nodes while verbs, adjectives, prepositions, or other words are represented as relationships between nodes. For example, the tuple may be:

-(solvent)→company-(sends)→reminder-(to)→-(indebted)→customer

While a sentence may have a single dimension representing a semantic sentence flow, different types of symbolic data may include multiple tuple dimensions. In an embodiment, after converting the symbolic data into a tuple format, the subsymbolic encoder system may determine the dimension of the tuple. This dimension may correspond to the number of tuple elements. For example, for the tuples presented above, the tuple may include seven tuple elements (n=7) corresponding to each word of the sentence.

The subsymbolic encoder system may include a dictionary that maps each tuple element to a dictionary identification. In an embodiment, the dictionary may contain a list of tuple elements or words. In an embodiment, the subsymbolic encoder system may build the dictionary and/or add new tuple elements as different symbolic graphs are converted into subsymbolic form. As the subsymbolic encoder system receives new tuple elements, the subsymbolic encoder system may add the new tuple elements to the dictionary with a corresponding dictionary identification to build the dictionary. In this manner, the dictionary may include words of previously encoded tuples.

When the subsymbolic encoder system generates the tuple, the subsymbolic encoder system may search the dictionary for dictionary identifications corresponding to each word of the tuple. The dictionary identifications may be numerical values and/or may indicate an index location of the dictionary. For example, Table 1 below may represent a mapping of dictionary identifications to words of the tuple.

TABLE 1

| Dictionary Identification | Tuple Element |
|---|---|
| 1 | company |
| 2 | customer |
| 12 | to |
| 15 | sends |
| 27 | reminder |
| 30 | solvent |
| 31 | indebted |

Using the dictionary identifications corresponding to each tuple element along with (1) the length of the tuple and (2) the position of the tuple element within the tuple, the subsymbolic encoding system may convert the tuple elements into a subsymbolic vector while maintaining the arrangement of the original symbolic graph. In an embodiment, to convert the tuple into a subsymbolic vector, the subsymbolic encoder system may calculate a decimal value corresponding to the tuple elements. This decimal value may preserve the ordering of the symbolic elements based on a rank or ordering of the decimal value. Utilizing an exponential component, the subsymbolic encoder system may be able to perform this conversion.

In an embodiment, the subsymbolic encoder system may utilize the following function to determine a decimal representation of each tuple element:

$$t_i = n^{n-i} + d_{ti}$$

In this equation, the element "$t_i$" may represent the decimal value for the current tuple element under evaluation. The element "i" in this equation may refer to the position of the tuple element within the tuple, wherein the first element begins with i=0. The element "$d_{ti}$" may be the dictionary identification corresponding to the tuple element. This element may be a numerical value. The element "$n^{n-i}$" may be an exponential component. This exponential component may utilize the number of tuple elements, "n", of the tuple as well as the position of the current tuple element under evaluation i. In an embodiment, the exponential component may generate an encoded value that preserves the arrangement of the tuple elements. For example, if the exponential component includes a large magnitude, this value may indicate that a tuple element is arranged in an earlier position relative to an exponential component with a smaller magnitude. Using the exponential component, the subsymbolic encoder system may preserve the arrangement of the tuple even after converting the symbolic data into a subsymbolic form.

To illustrate the calculation of a decimal value for each of the tuple elements of the tuple, the subsymbolic encoder system may apply the function described above to the previously described tuple. This application may yield a decimal value for each tuple element.

For example, the tuple <solvent, company, sends, reminder, to, indebted, customer> may include seven tuple elements with n=7. To calculate the decimal value of the first tuple element or word "solvent", the subsymbolic encoder system may apply the above-described function. In this case, the position i may begin at zero. Using this information, the exponential component may be "$n^{n-i}$" which for this case may be $7^{7-0}=823543$. The element "$d_{ti}$" may correspond to the dictionary identification for the word "solvent" and may, in this example, be the numerical value 30 based on the search of the dictionary. Combining the exponential component and numerical value may result in the decimal value of $t_0=823573$. The subsymbolic encoder system may apply this calculation to the other tuple elements of the tuple.

Table 2 depicts an embodiment of the application of the above-described function to each of the tuple elements of the tuple.

TABLE 2

| Tuple Element | Position of Tuple Element "i" | Dictionary Identification "$d_{ti}$" | Application of Function | Resulting Decimal Value "$t_i$" |
|---|---|---|---|---|
| solvent | 0 | 30 | $7^7 + 30$ | 823573 |
| company | 1 | 1 | $7^6 + 1$ | 117650 |
| sends | 2 | 15 | $7^5 + 15$ | 16822 |
| reminder | 3 | 27 | $7^4 + 27$ | 2428 |
| to | 4 | 12 | $7^3 + 12$ | 355 |
| indebted | 5 | 31 | $7^2 + 31$ | 80 |
| customer | 6 | 2 | $7^1 + 2$ | 9 |

Based on the calculation of a decimal value, the subsymbolic encoder system may convert the decimal value into a binary value to generate a subsymbolic value for the tuple element. For example, the binary value for "solvent" may convert the decimal value of 823573 into "11001001000100010101". The subsymbolic encoder system may perform this binary conversion for each of the tuple elements and determine the binary representation with the maximum length or most bits. The subsymbolic encoder system may adjust the shorter binary digits by prepending zeros to the binary value. Table 3 provides an embodiment of this conversion from the decimal value into a binary value.

TABLE 3

| Tuple Element | Resulting Decimal Value "$t_i$" | Binary Representation |
|---|---|---|
| solvent | 823573 | 11001001000100010101 |
| company | 117650 | 00011100101110010010 |
| sends | 16822 | 00000100000110110110 |
| reminder | 2428 | 00000000100101111100 |
| to | 355 | 00000000000101100011 |
| indebted | 80 | 00000000000001010000 |
| customer | 9 | 00000000000000001001 |

In an embodiment, the value of 823573 may include the longest number of bits with a length of 20 bits. As a result, the subsymbolic encoder system may convert each of the other values so that the other values are also represented using 20 bits. These binary values may then be utilized by subsymbolic intelligence systems, such as, for example, neural networks. In an embodiment, the subsymbolic encoder system may format the binary values in the shape of a vector of length "n". The subsymbolic intelligence system may then utilize the weights and/or may view the relationship between the elements of the vector to perform calculations and/or other processing. In this manner, the subsymbolic encoder system may convert the symbolic data into a subsymbolic format while preserving the semantic relationship between symbolic elements using a ranked binary representation. In an embodiment, this rank may be based on the decimal value. In an embodiment, this rank may be determined based on the first encountered "1" bit. For example, if a tuple includes many leading zero bits, a subsymbolic intelligence system may be able to determine that the word occurs later in the sentence.

As will be discussed below, in some embodiments, the subsymbolic encoder system is also able to provide weighted relationship information to the subsymbolic intelligence system. This weighted relationship information may aid in statistical predictability determinations. For example, if a first word is received, a weighted relationship may predict a likelihood that a particular second word follows the first word. Further, subsymbolic encoder system is able to decode encoded subsymbolic data received from the subsymbolic intelligence system. In this manner, the subsymbolic encoder system may transform subsymbolic data into symbolic data and/or into a human-readable form.

These features will now be discussed with respect to the corresponding figures.

Figure 1:
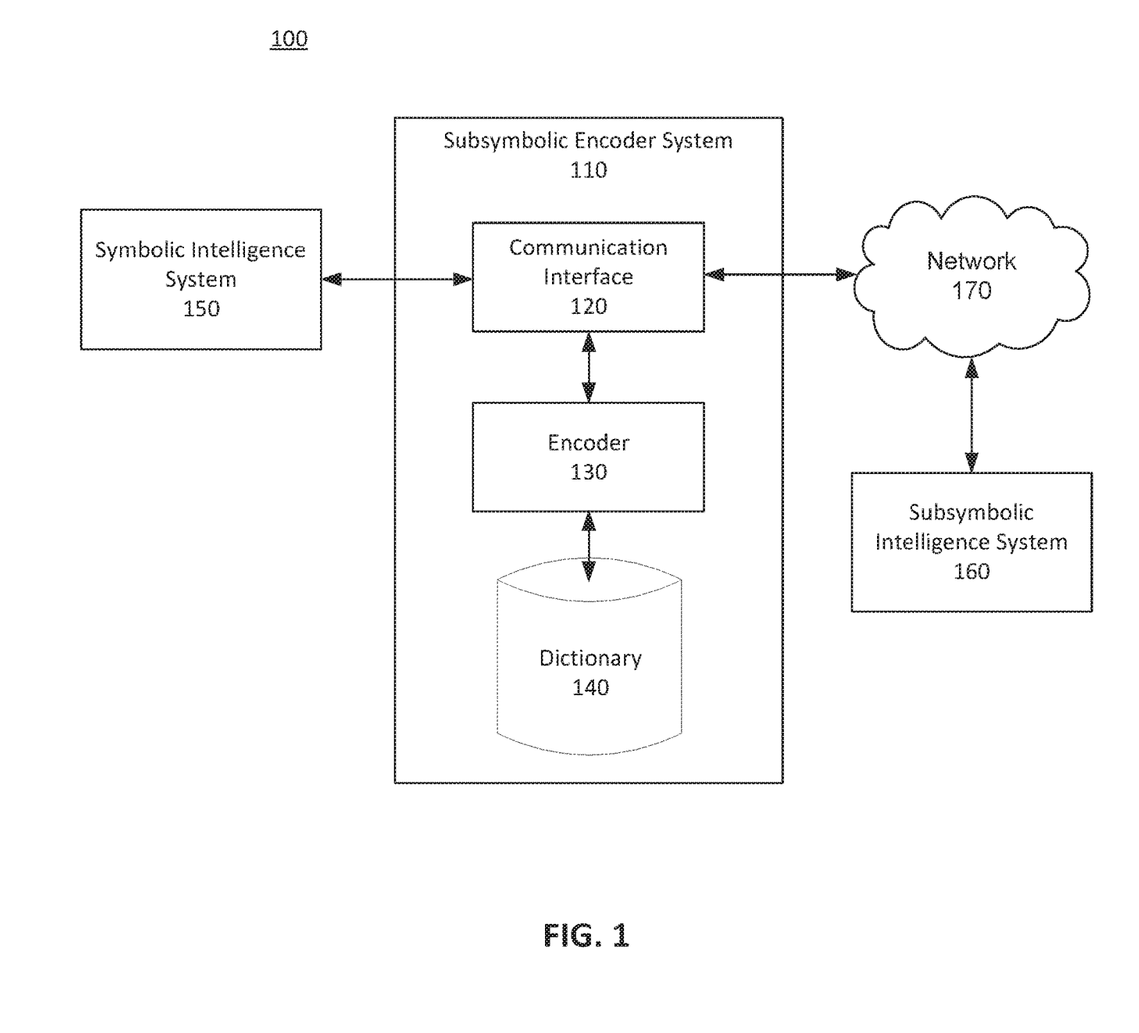
FIG. 1 depicts a block diagram of a subsymbolic encoding environment, according to some embodiments.

FIG. 1 depicts a block diagram of a subsymbolic encoding environment 100, according to some embodiments. In an embodiment, encoding environment 100 may include subsymbolic encoder system 110, symbolic intelligence system 150, subsymbolic intelligence system 160, and/or network 170.

Subsymbolic encoder system 110 may include one or more processors, memory, servers, routers, modems, and/or antennae configured to receive symbolic data from symbolic intelligence system 150, communicate via network 170, and/or provide encoded subsymbolic data to subsymbolic intelligence system 160. In an embodiment, subsymbolic encoder system 110 may receive subsymbolic data from subsymbolic intelligence system 160, decode the encoded subsymbolic data, convert the subsymbolic data into a symbolic format, and/or transmit the symbolic data to symbolic intelligence system 150.

In an embodiment, symbolic intelligence system 150 may include one or more processors, memory, servers, routers, modems, and/or antennae configured to receive, process, and/or transmit symbolic data. For example, symbolic intelligence system 150 may receive and/or process human-readable and/or natural language symbolic data. Symbolic intelligence system 150 may implement cognitive simulations, logic-based knowledge representations or learning, scruffy paradigms, and/or other knowledge-based systems. In an embodiment, while FIG. 1 depicts subsymbolic encoder system 110 as a system separate from symbolic intelligence system 150, symbolic intelligence system 150 and/or subsymbolic encoder system 110 may be implemented in the same system and/or may share the same or overlapping hardware.

In an embodiment, symbolic intelligence system 150 may include textual and/or speech-to-text input device to convert different data types into symbolic representations of data. For example, symbolic intelligence system 150 may receive voice audio and/or may convert this voice audio into a symbolic representation. Symbolic intelligence system 150 may then transmit this symbolic data to subsymbolic encoder system 110 to perform subsymbolic encoding and/or processing. Symbolic intelligence system 150 may also receive symbolic data from subsymbolic encoder system 110 and/or may process the symbolic data in a manner to allow human interaction with the data. For example, symbolic intelligence system 150 may display the symbolic data on a display screen, generate a graphical user interface displaying the symbolic data, and/or allow a user to view and/or interact with the displayed data. Symbolic intelligence system 150 may receive inputs from a human or user and/or convert these inputs into a symbolic form for transmission to subsymbolic encoder system 110. In an embodiment, symbolic intelligence system 150 may facilitate user interaction with subsymbolic data processed by subsymbolic intelligence system 160 and/or symbolic data encoded by subsymbolic encoder system 110.

In an embodiment, subsymbolic intelligence system 160 may include one or more processors, memory, servers, routers, modems, and/or antennae configured to receive, process, and/or transmit subsymbolic data. Subsymbolic intelligence system 160 may perform subsymbolic artificial intelligence processing. For example, subsymbolic intelligence system 160 may utilize embodied intelligence, cybernetics, control theory, cognitive science theory, computational intelligence, neural networks, soft computing, evolutionary computation, fuzzy systems, statistics based computation, and/or other processes using subsymbolic data. In an embodiment, subsymbolic data may include binary representations of data. In an embodiment, this binary data may be formatted and/or grouped into vectors representing symbolic data. The subsymbolic data may also include weighted relationship data indicative of a predictability measurement and/or a relationship between different nodes or elements of symbolic data.

In an embodiment, subsymbolic intelligence system 160 may receive subsymbolic data from subsymbolic encoder system 110 via network 170. Subsymbolic encoder system 110 may communicate with subsymbolic intelligence system 160 via network 170 and/or a network protocol to send and receive data over network 170. Network 170 may be a network capable of transmitting information either in a wired or wireless manner and may be, for example, the Internet, a Local Area Network (LAN), or a Wide Area Network (WAN). The network protocol may be, for example, a hypertext transfer protocol (HTTP), a TCP/IP protocol, User Datagram Protocol (UDP), Ethernet, cellular, Bluetooth, or an asynchronous transfer mode, and/or a combination of the listed protocols. In an embodiment, subsymbolic encoder system 110 may communicate with symbolic intelligence system 150 via network 170.

In an embodiment, although depicted as separate systems, subsymbolic encoder system 110 may comprise the same and/or overlapping hardware with subsymbolic intelligence system 160. In an embodiment, symbolic intelligence system 150 may be a system separate from the combination of subsymbolic encoder system 110 and subsymbolic intelligence system 160. In an embodiment, symbolic intelligence system 150 and sub symbolic encoder system 110 may be a combination separate from subsymbolic intelligence system 160. In an embodiment, symbolic intelligence system 150, subsymbolic encoder system 110, and/or subsymbolic intelligence system 160 may comprise the same and/or overlapping hardware to represent a unified system.

In an embodiment, subsymbolic encoder system 110 may include communication interface 120, encoder 130, and/or dictionary 140. In an embodiment, communication interface 120 may include circuitry to perform wired and/or wireless communication with symbolic intelligence system 150 and/or subsymbolic intelligence system 160. Communication interface 120 may also communicate using network 170. Communication interface 120 may receive symbolic data from symbolic intelligence system 150 and/or transmit symbolic data to symbolic intelligence system 150. Communication interface 120 may transmit subsymbolic data to subsymbolic intelligence system 160 and/or receive subsymbolic data from subsymbolic intelligence system 160.

In an embodiment, communication interface 120 may receive data from either symbolic intelligence system 150 or subsymbolic intelligence system 160. Communication interface 120 may pass this received data to encoder 130. In some embodiments, encoder 130 may execute the methods described with reference to FIG. 2 or FIG. 3. In an embodiment, encoder 130 may include one or more processors configured to convert symbolic data received from symbolic intelligence system 150 into a subsymbolic data representation. In an embodiment, encoder 130 may utilize an exponential component in order to retain semantic information related symbolic graphs, rules, and/or trees received from symbolic intelligence system 150. Encoder 130 may utilize dictionary 140 to perform the encoding of the symbolic data. Dictionary 140 may be a list stored in memory of sub symbolic encoder system 110. Dictionary 140 may include numerical dictionary identifications corresponding to tuple elements and/or symbol elements of received data. In an embodiment, subsymbolic encoder system 110 may utilize a pre-stored dictionary that maps dictionary identifications to symbol elements. In an embodiment, subsymbolic encoder system 110 may build dictionary 140 as encoder 130 processes new symbol elements. For example, as encoder 130 encounters new words not previously stored in dictionary 140, encoder 130 may assign the new word a new dictionary identification and/or store this association in dictionary 140.

In an embodiment, encoder 130 may receive symbolic data from symbolic intelligence system 150. This symbolic data may be a sequence of words, such as, for example, a sentence. In an embodiment, this symbolic data may be a multiple tuple dimension. For example, the symbolic data may include multiple nodes or symbolic elements. These symbolic elements may include multiple connections or relationships to other symbolic elements of the symbolic data. In this manner, the symbolic data may include multiple dimensions.

Based on receiving this symbolic data, encoder 130 may convert the symbolic data into a tuple format. This tuple format may include a semantic and/or syntactic relationship between elements of the symbolic data. Encoder 130 may also make note of the length of the tuple. Encoder 130 may then obtain a dictionary identification for each tuple element of the tuple. If the symbolic data is a sentence, the tuple elements may be words of the sentence. Encoder 130 may then calculate a decimal value for each of the tuple elements. This calculation may utilize an exponential component to preserve the semantic and/or syntactic relationship between the tuple elements.

In an embodiment, encoder 130 may utilize the following function to determine a decimal representation of each tuple element:

$$t_i = n^{n-i} + d_{ti}$$

In this equation, the element "$t_i$" may represent the decimal value for the current tuple element under evaluation. The element "i" in this equation may refer to the position of the tuple element within the tuple, wherein the first element begins with i=0. The element "$d_{ti}$" may be the dictionary identification corresponding to the tuple element. This element may be a numerical value. The element "$n^{n-i}$" may be an exponential component. This exponential component may utilize the number of tuple elements of the tuple, "n", as well as the position of the current tuple element under evaluation i. In an embodiment, the exponential component may generate an encoded value that preserves the arrangement of the tuple elements. For example, if the exponential component includes a large magnitude, this value may indicate that a tuple element is arranged in an earlier position relative to an exponential component with a smaller magnitude. Using the exponential component, the subsymbolic encoder system may preserve the arrangement of the tuple even after converting the symbolic data into a subsymbolic form.

Figure 2:
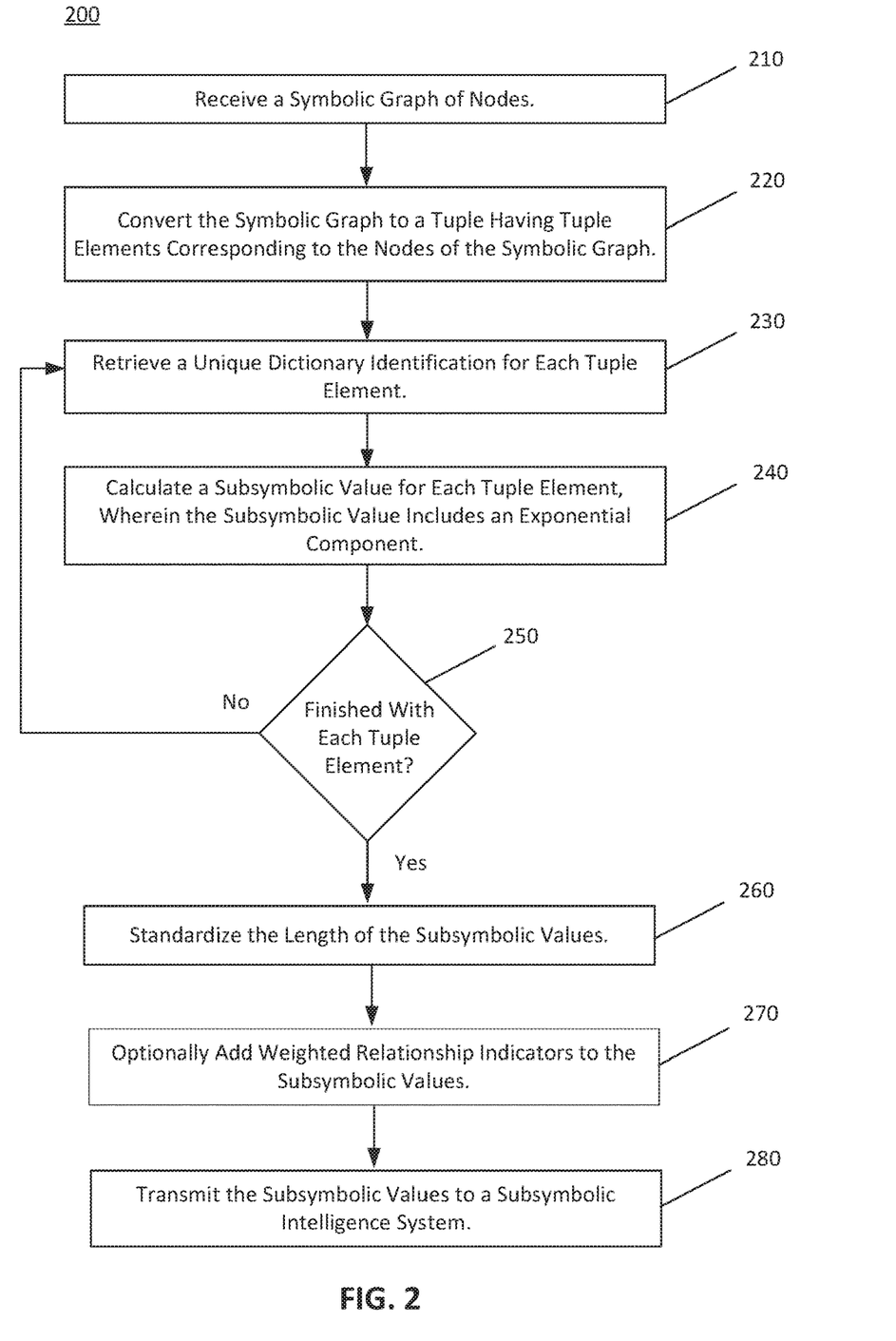
FIG. 2 depicts a flowchart illustrating a method for encoding symbolic data into a sub symbolic format, according to some embodiments.

Encoder 130 may perform this decimal value determination iteratively for each tuple element. After completing this calculation, encoder 130 may convert the decimal value into a binary value. Encoder 130 may examine the decimal value having the longest length of bits and/or prepend zeros to the other elements so that the binary values have a uniform length. Once encoder 130 has encoded these binary values from the symbolic data, encoder 130 may package the binary values into a vector configured to be usable with subsymbolic intelligence system 160. This vector may represent a subsymbolic representation of the received symbolic data. The discussion with respect to FIG. 2 provides an embodiment of a method for converting symbolic data to subsymbolic data.

In an embodiment, encoder 130 may also provide weighted relationship information to subsymbolic intelligence system 160. This weighted relationship information may aid in statistical predictability determinations. For example, if a first word is received, a weighted relationship may predict a likelihood that a particular second word follows the first word. In an embodiment, symbolic intelligence system 150 may provide weighted relationship information to subsymbolic encoder system 110 along with symbolic data.

For example, if the symbolic data is a text graph, the words may be connected via weighted relationships. These weighted relationships may be numerical values that may indicate a path likelihood and/or a statistical probability. For example, a weighted relationship may be a value between 0.0 and 1.0 or 0 and 10. A higher value may indicate that words are more closely related. For example, the word "green" may have a weighted relationship of 0.7 with the word "tree" to indicate a likelihood that the word "tree" may follow the word "green." In contrast, the word "green" may have a weighted relationship of 0.1 with the word "sun" to indicate a lower likelihood that the word following "green" is "sun." In this manner, the weighted relationship may allow subsymbolic intelligence system 160 to perform statistic processing and/or determine likelihoods for subsymbolic processing.

In an embodiment, encoder 130 may encode this weighted relationship using binary values appended to the binary values encoded from the calculated decimal values. For example, encoder 130 may use four bits to encode a value between 0.0 and 1.0 or 0 and 10. To encode a "0.7" weighted relationship value, encoder 130 may append the bits "0111" to a word indicating the weighted relationship of the following word.

For example, the symbolic data may be a sentence, "Solvent company sends reminder to indebted customer." Table 4 depicts an embodiment with weighted averages between the words in the sentence. In an embodiment, the final four digits of the binary representation may represent a binary version of the weighted relationship between the current word and the next word.

TABLE 4

| Tuple Element | Weighted Relationship To Next Word | Binary Representation Without Weighted Relationship | Binary Representation With Weighted Relationship as Last Four Digits |
|---|---|---|---|
| solvent | 0.7 | 11001001000100010101 | 110010010001000101010111 |
| company | 0.2 | 00011100101110010010 | 000111001011100100100010 |
| sends | 1.0 | 00000100000110110110 | 000001000001101101101010 |
| reminder | 0.1 | 00000000100101111100 | 000000001001011111000001 |
| to | 0.4 | 00000000000101100011 | 000000000001011000110100 |
| indebted | 0.2 | 00000000000001010000 | 000000000000010100000010 |
| customer | — | 00000000000000001001 | 000000000000000010010000 |

In an embodiment, encoder 130 may include this weighted relationship information when converting symbolic data into a subsymbolic format. In an embodiment, the weighted relationship information may be appended to the lesser digits of the binary representation. In this manner, encoder 130 may still preserve the semantic ordering of the tuple elements based on the ranking of the decimal value of the tuple elements. Similarly, if subsymbolic intelligence system 160 utilizes the leading zeros to determine the ordering of the vector elements, subsymbolic intelligence system 160 may still be able to utilize the binary representation because the appended bits may not disturb the previously determined ordering of binary values.

Based on receipt of a vector including these binary values, subsymbolic intelligence system 160 may process the symbolic data provided by symbolic intelligence system 150 while still recognizing the semantic relationship between elements of the symbolic data. In an embodiment, subsymbolic intelligence system 160 may process this subsymbolic data and/or transmit subsymbolic data back to subsymbolic encoder system 110. In an embodiment, sub symbolic encoder system 110 may receive subsymbolic data in response to providing encoded symbolic data or may receive subsymbolic data without prompting subsymbolic intelligence system 160. In an embodiment, subsymbolic encoder system 110 may decode received subsymbolic data for translation and/or transmission to symbolic intelligence system 150.

In an embodiment, communication interface 120 may receive a subsymbolic vector from subsymbolic intelligence system 160. Encoder 130 may process the subsymbolic vector in a reverse manner from the process of encoding symbolic data into subsymbolic form. In an embodiment, encoder 130 may decode a received subsymbolic vector. For example, encoder 130 may first determine if the subsymbolic data includes weighted relationship information. Encoder 130 may determine whether to expect weighted relationship information based on a previous communication protocol established with subsymbolic intelligence system 160, and/or subsymbolic intelligence system 160 may notify sub symbolic encoder system 110 that the vector provided includes weighted relationship information.

If the received subsymbolic data includes weighted relationship information, encoder 130 may extract this information so that this information may be separate from the encoded symbol elements. For example, if the weighted relationship information is represented by the final four bits of a vector element, encoder 130 may separate these final four bits from each vector element. Encoder 130 may then decode the remaining bits.

To decode the remaining bits, encoder 130 may remove the exponential component from the subsymbolic elements of the vector. For example, using the length of the vector as well as the position of each vector element when the vector elements are ranked, encoder 130 may determine and/or remove the exponential component. To illustrate an embodiment, encoder 130 may receive a vector of six binary values as shown in Table 5. Encoder 130 may organize and/or rank these binary values based on the decimal value represented and/or the ranking the values based on when a leading "1" bit is first detected.

TABLE 5

| Binary Value |
|---|
| 1011011001001001 |
| 0001111001101000 |
| 0000010100010101 |
| 0000000011101100 |
| 0000000001000011 |
| 0000000000001000 |

Using the length of the vector as well as the position of each vector element as ranked, encoder 130 may remove the exponential component from each vector element and/or extract a dictionary identification from the remaining numerical value.

In an embodiment, encoder 130 may apply the following function to each vector element to determine the dictionary identification:

$$d_{ti} = t_i - m^{m-i}$$

In this equation, the element "$d_{ti}$" may be the dictionary identification corresponding to the vector element. The element "$t_i$" may represent the decimal value for the current vector element under evaluation. The element "i" in this equation may refer to the position of the vector element within the vector, wherein the first element begins with i=0. The first element may be the element with the highest rank. The element "$m^{m-i}$" may be the exponential component. This exponential component may utilize the number of vector elements, "m", of the vector as well as the position of the current vector element under evaluation i. Table 6 depicts an embodiment demonstrating the application of the above function to the vector received in Table 5:

TABLE 6

| Binary Value | Decimal Value "$t_i$" | Position of Tuple Element "i" | Application of Function | Dictionary Identification "$d_{ti}$" |
|---|---|---|---|---|
| 1011011001001001 | 46665 | 0 | $46665-6^6$ | 9 |
| 0001111001101000 | 7784 | 1 | $7784-6^5$ | 8 |
| 0000010100010101 | 1301 | 2 | $1301-6^4$ | 5 |
| 0000000011101100 | 236 | 3 | $236-6^3$ | 20 |
| 0000000001000011 | 67 | 4 | $67-6^2$ | 31 |
| 0000000000001000 | 8 | 5 | $8-6^1$ | 2 |

Applying the function to each of the vector elements may yield a dictionary identification for each of the vector elements. Based on the ranking of the vector elements, encoder 130 is able to determine the semantic arrangement of the received vector elements. Encoder 130 is able to order the vector elements even if the received vector elements are not received in ranked order.

After the application of the function, encoder 130 is able to retrieve a symbol from dictionary 140 corresponding to each of dictionary identification extracted from the received binary values. Table 7 illustrates an embodiment of symbols mapped to the extracted dictionary identification values determined from Table 6.

TABLE 7

| Binary Value | Dictionary Identification "$d_{ti}$" | Corresponding Symbol |
|---|---|---|
| 1011011001001001 | 9 | create |
| 0001111001101000 | 8 | payment |
| 0000010100010101 | 5 | request |
| 0000000011101100 | 20 | for |
| 0000000001000011 | 31 | indebted |
| 0000000000001000 | 2 | customer |

Based on these symbols, encoder 130 may recreate a tuple and/or a symbol graph representing the received subsymbolic data. In an embodiment, encoder 130 may generate the sentence "Create payment request for indebted customer." In an embodiment, encoder 130 may utilize dictionary 140 for dictionary identifications for encoding from a symbolic format to a subsymbolic format as well as from a subsymbolic format into a symbolic format. After converting and/or decoding the received subsymbolic data, subsymbolic encoder system 110 may transmit the symbolic representation in the designated semantic arrangement to symbolic intelligence system 150.

FIG. 2 depicts a flowchart illustrating a method 200 for encoding symbolic data into a subsymbolic format, according to some embodiments. Method 200 shall be described with reference to FIG. 1; however, method 200 is not limited to that example embodiment.

In an embodiment, sub symbolic encoder system 110 utilizes method 200 to encode symbolic data received from symbolic intelligence system 150 into a subsymbolic format while preserving the semantic or syntactic structure of the symbolic data. The foregoing description will describe an embodiment of the execution of method 200 with respect to subsymbolic encoder system 110. While method 200 is described with reference to subsymbolic encoder system 110, method 200 may be executed on any computing device, such as, for example, the computer system described with reference to FIG. 4 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 2, as will be understood by a person of ordinary skill in the art.

In an embodiment, at 210, subsymbolic encoder system 110 may receive a symbolic graph of nodes. The nodes may represent symbolic elements. In an embodiment, sub symbolic encoder system 110 may receive the symbolic graph of nodes in the form of a sentence or a sequence of words. For example, the sentence may be, "Solvent company sends reminder to indebted customer." Each word in the sentence may be a node. The sentence taken as a whole may be a symbolic graph of nodes.

At 220, subsymbolic encoder system 110 may convert the symbolic graph to a tuple having tuple elements corresponding to the nodes of the symbolic graph. Using the previous sentence as an example, subsymbolic encoder system 110 may convert the sentence from a symbolic graph having text adjacency into a tuple. A tuple may be a computer format or a finite ordered list for representing the elements of the graph. For example, a tuple representing the previous sentence may be:

<solvent, company, sends, reminder, to, indebted, customer>

While a sentence may have a single dimension representing a semantic sentence flow, different types of symbolic data may include multiple tuple dimensions. In an embodiment, after converting the symbolic data into a tuple format, subsymbolic encoder system 110 may determine the dimension of the tuple. This dimension may correspond to the number of tuple elements. For example, for the tuple presented above, the tuple may include seven tuple elements (n=7) corresponding to each word of the sentence.

At 230, subsymbolic encoder system 110 may retrieve a unique dictionary identification for each tuple element. Encoder 130 may perform the analysis and may retrieve the unique dictionary identification from dictionary 140. In an embodiment, sub symbolic encoder system 110 may build dictionary 140 and/or add new tuple elements as different symbolic graphs are converted into subsymbolic form. As subsymbolic encoder system 110 receives new tuple elements, subsymbolic encoder system 110 may add the new tuple elements to the dictionary with a corresponding dictionary identification to build dictionary 140. In this manner, dictionary 140 may include words of previously encoded tuples.

When subsymbolic encoder system 110 generates the tuple, subsymbolic encoder system 110 may search dictionary 140 for unique dictionary identifications corresponding to each word of the tuple. The dictionary identifications may be numerical values and/or may indicate an index location of dictionary 140. For example, Table 1 described above may represent a mapping of dictionary identifications to words of the tuple. In an embodiment, encoder system 110 may retrieve unique dictionary identifications iterative for each tuple element. In an embodiment, the unique dictionary identifications map to words so that a unique word is not associated with more than one dictionary identification. In an embodiment, the unique dictionary identifications may utilize a one-to-one mapping to words such that a dictionary identification is not associated with more than one word.

At 240, subsymbolic encoder system 110 may calculate a subsymbolic value for each tuple element, wherein the subsymbolic value includes an exponential component. This sub symbolic value may be a decimal value or may be another alphanumeric value that encodes tuple elements.

Using the dictionary identifications corresponding to each tuple element along with (1) the length of the tuple and (2) the position of the tuple element within the tuple, subsymbolic encoding system 110 may convert the tuple elements into a subsymbolic vector while maintaining the arrangement of the original symbolic graph. In an embodiment, to convert the tuple into a subsymbolic vector, sub symbolic encoder system 110 may calculate a decimal value or subsymbolic value corresponding to the tuple elements. This decimal value may preserve the ordering of the symbolic elements based on a rank or ordering of the decimal value.

Utilizing an exponential component, subsymbolic encoder system 110 may be able to perform this conversion.

In an embodiment, subsymbolic encoder system 110 may utilize the following function to determine a decimal representation or subsymbolic value of each tuple element:

$$t_i = n^{n-i} + d_{ti}$$

In this equation, the element "$t_i$" may represent the decimal value or subsymbolic value for the current tuple element under evaluation. The element "i" in this equation may refer to the position of the tuple element within the tuple, wherein the first element begins with i=0. The element "$d_{ti}$" may be the dictionary identification corresponding to the tuple element. This element may be a numerical value. The element "$n^{n-i}$" may be an exponential component. This exponential component may utilize the number of tuple elements, "n", of the tuple as well as the position of the current tuple element under evaluation i. In an embodiment, the exponential component may generate an encoded value that preserves the arrangement of the tuple elements. For example, if the exponential component includes a large magnitude, this value may indicate that a tuple element is arranged in an earlier position relative to an exponential component with a smaller magnitude. Using the exponential component, subsymbolic encoder system 110 may preserve the arrangement of the tuple even after converting the symbolic data into a subsymbolic form.

To illustrate the calculation of a decimal value or subsymbolic value for each of the tuple elements of the tuple, the subsymbolic encoder system may apply the function described above to the previously described tuple. This application may yield a decimal value for each tuple element.

For example, the tuple <solvent, company, sends, reminder, to, indebted, customer> may include seven tuple elements with n=7. To calculate the decimal value of the first tuple element or word "solvent", subsymbolic encoder system 110 may apply the above-described function. In this case, the position i may begin at zero. Using this information, the exponential component may be "$n^{n-i}$" which for this case may be $7^{7-0}$=823543. The element "$d_{ti}$" may correspond to the dictionary identification for the word "solvent" and may, in this example, be the numerical value 30 based on the search of dictionary 140. Combining the exponential component and numerical value may result in the decimal value of $t_0$=823573. Subsymbolic encoder system may assign this decimal value as the sub symbolic value and/or apply this calculation to the other tuple elements of the tuple.

Based on the calculation of a decimal value, subsymbolic encoder system 110 may convert the decimal value into a binary value to generate a subsymbolic value for the tuple element. For example, the binary value for "solvent" may convert the decimal value of 823573 into "11001001000100010101". Subsymbolic encoder system 110 may perform this binary conversion for each of the tuple elements.

At 250, subsymbolic encoder system 110 may determine whether a subsymbolic value has been determined for each tuple element. In an embodiment, subsymbolic encoder system 110 may iteratively perform the decimal calculation to generate the decimal values listed in Table 2. At 250, if a decimal value and/or a binary value has not been determined for each tuple element, subsymbolic encoder system 110 may return to 230 to retrieve a dictionary identification for the next tuple element. In an embodiment, subsymbolic encoder system 110 may increment the counter i to continue to the next tuple element.

If subsymbolic encoder system 110 has determined a decimal value and/or a binary value for each tuple element of the tuple, at 260, subsymbolic encoder system 110 may standardize the length of the subsymbolic values. Subsymbolic encoder system 110 may determine the maximum length of the subsymbolic value or determine the subsymbolic value having the most bits. Table 3 provides an embodiment of this standardization. In an embodiment, the subsymbolic value of 823573 may include the longest number of bits with a length of 20 bits. As a result, subsymbolic encoder system 110 may convert each of the other sub symbolic values so that the other values are also represented using 20 bits. In an embodiment, subsymbolic encoder system 110 may prepend zero bits to the other values to standardize the length.

At 270, if subsymbolic encoder system 110 has received weighted relationship information corresponding to the nodes of the symbolic graph, subsymbolic encoder system 110 may optionally add weighted relationship indicators to the subsymbolic values. Subsymbolic encoder system 110 may optionally execute 270 or may not execute 270. In an embodiment, subsymbolic encoder system 110 may execute 270 if subsymbolic encoder system 110 has received weighted relationship information associated with the received symbolic graph of nodes. This weighted relationship information may aid in statistical predictability determinations. For example, if a first word is received, a weighted relationship may predict a likelihood that a particular second word follows the first word. In an embodiment, symbolic intelligence system 150 may provide weighted relationship information to subsymbolic encoder system 110 along with the symbolic graph.

In an embodiment, subsymbolic encoder system 110 may encode these weighted relationships using binary values appended to the subsymbolic values. For example, sub symbolic encoder system 110 may use four bits to encode a value between 0.0 and 1.0 or 0 and 10. To encode a "0.7" weighted relationship value, subsymbolic encoder system 110 may append the bits "0111" to a word indicating the weighted relationship of the following word.

For example, the symbolic graph may be a sentence, "Solvent company sends reminder to indebted customer." Table 4 depicts an embodiment with weighted averages between the words in the sentence. In an embodiment, the final four digits of the binary representation may represent a binary version of the weighted relationship between the current word and the next word.

In an embodiment, subsymbolic encoder system 110 may include this weighted relationship information when converting nodes into subsymbolic values. In an embodiment, the weighted relationship information may be appended to the lesser digits of the binary representation. In this manner, subsymbolic encoder system 110 may still preserve the semantic ordering of the tuple elements based on the ranking of the decimal value of the tuple elements. Similarly, if subsymbolic intelligence system 160 utilizes the leading zeros to determine the ordering of the vector elements, subsymbolic intelligence system 160 may still be able to utilize the binary representation because the appended bits may not disturb the previously determined ordering of binary values.

At 280, subsymbolic encoder system 110 may transmit the subsymbolic values to subsymbolic intelligence system 160. In an embodiment, subsymbolic encoder system 110 may format the subsymbolic values into a vector or into a format readable by subsymbolic intelligence system 160.

Figure 3:
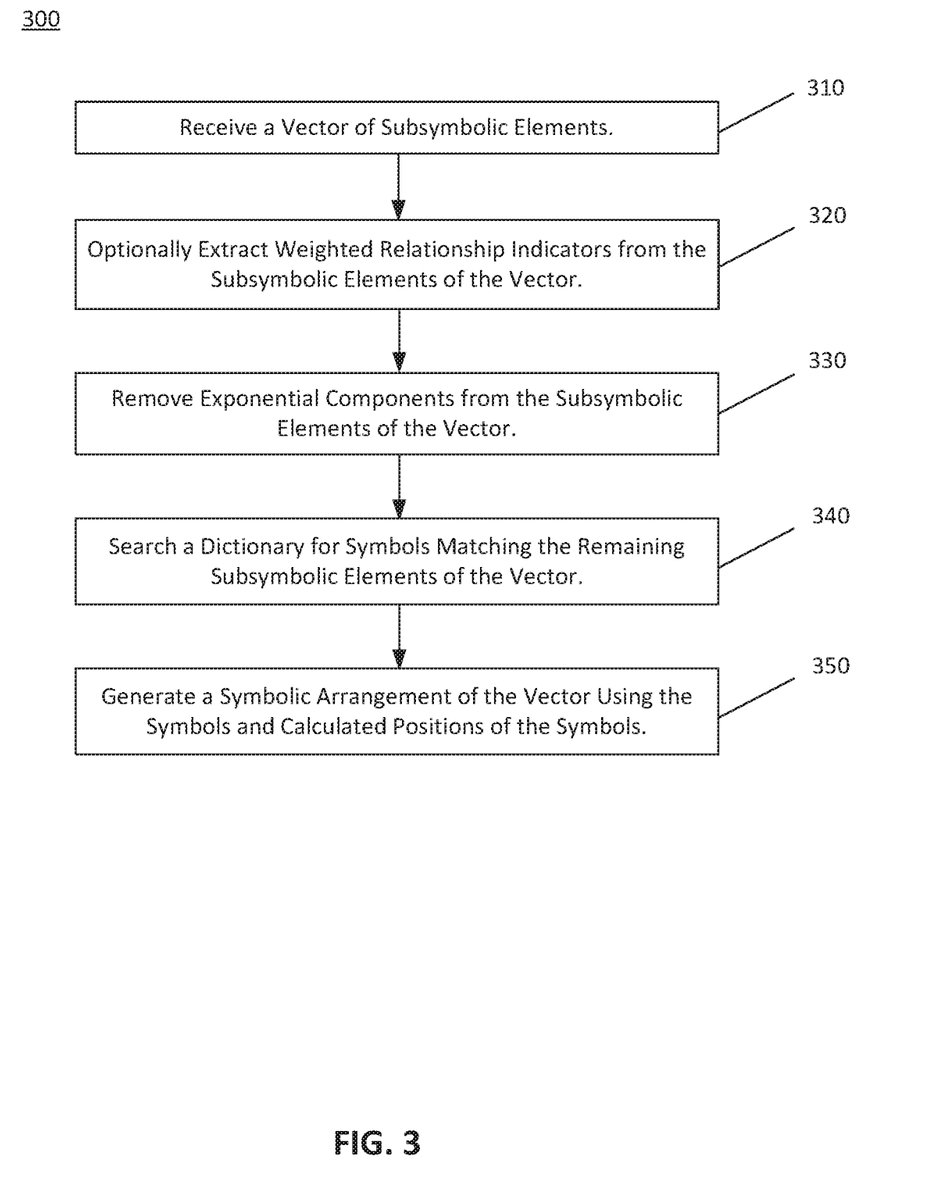
FIG. 3 depicts a flowchart illustrating a method for decoding subsymbolic data into a symbolic format, according to some embodiments.

FIG. 3 depicts a flowchart illustrating a method 300 for decoding subsymbolic data into a symbolic format, according to some embodiments. Method 300 shall be described with reference to FIG. 1; however, method 300 is not limited to that example embodiment.

In an embodiment, subsymbolic encoder system 110 may utilize method 300 to decode subsymbolic data into a symbolic form while also generating a semantic relationship between the nodes of the symbolic data. The foregoing description will describe an embodiment of the execution of method 300 with respect to subsymbolic encoder system 110. While method 300 is described with reference to subsymbolic encoder system 110, method 300 may be executed on any computing device, such as, for example, the computer system described with reference to FIG. 4 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3, as will be understood by a person of ordinary skill in the art.

In an embodiment, at 310, subsymbolic encoder system 110 may receive a vector of sub symbolic elements. In an embodiment, subsymbolic encoder system 110 may receive the vector from sub symbolic intelligence system 160 via network 170. Subsymbolic encoder system 110 may receive the vector as a response to providing symbolic data to subsymbolic intelligence system 160 and/or may receive the vector without first prompting subsymbolic intelligence system 160. Based on this receipt, subsymbolic encoder system 110 may process the subsymbolic vector in a reverse manner from the process of encoding symbolic data into subsymbolic form.

At 320, subsymbolic encoder system 110 may optionally extract weighted relationship indicators from the subsymbolic elements of the vector. For example, subsymbolic encoder system 110 may determine if the vector includes weighted relationship information. Subsymbolic encoder system 110 may determine whether to expect weighted relationship information based on a previous communication protocol established with subsymbolic intelligence system 160, and/or subsymbolic intelligence system 160 may notify sub symbolic encoder system 110 that the vector provided includes weighted relationship information.

If the received vector includes weighted relationship information, subsymbolic encoder system 110 may extract this information so that this information may be separate from the encoded symbol elements. For example, if the weighted relationship information is represented by the final four bits of a vector element, subsymbolic encoder system 110 may separate these final four bits from each vector element. Subsymbolic encoder system 110 may then decode the remaining bits. In an embodiment, if the received vector of subsymbolic elements does not include weighted relationship indicators, subsymbolic encoder system 110 may not execute 320. In an embodiment, subsymbolic encoder system 110 may execute 330 after 310 if the vector does not include weighted relationship indicators.

At 330, to decode the remaining bits, subsymbolic encoder system 110 may remove the exponential component from the subsymbolic elements of the vector. For example, using the length of the vector as well as the position of each vector element when the vector elements are ranked, subsymbolic encoder system 110 may determine and/or remove the exponential component. To illustrate an embodiment, subsymbolic encoder system 110 may receive a vector of six binary values as shown in Table 5. Subsymbolic encoder system 110 may organize and/or rank these binary values based on the decimal value represented and/or the ranking the values based on when a leading "1" bit is first detected.

Using the length of the vector as well as the position of each vector element as ranked, subsymbolic encoder system 110 may remove the exponential component from each vector element and/or extract a dictionary identification from the remaining numerical value.

In an embodiment, subsymbolic encoder system 110 may apply the following function to each vector element to remove the exponential component and/or determine the dictionary identification:

$$d_{ti} = t_i - m^{m-i}$$

In this equation, the element "$d_{ti}$" may be the dictionary identification corresponding to the vector element. The element "$t_i$" may represent the decimal value for the current vector element under evaluation. The element "i" in this equation may refer to the position of the vector element within the vector, wherein the first element begins with i=0. The first element may be the element with the highest rank. The element "$m^{m-i}$" may be the exponential component. This exponential component may utilize the number of vector elements, "m", of the vector as well as the position of the current vector element under evaluation i. Table 6 depicts an embodiment demonstrating the application of the above function to the vector received in Table 5.

Applying the function to each of the vector elements may yield a dictionary identification for each of the vector elements. Based on the ranking of the vector elements, subsymbolic encoder system 110 is able to determine the semantic arrangement and/or symbolic graph position of the received vector elements. Subsymbolic encoder system 110 is able to order the vector elements even if the received vector elements are not received in ranked order.

At 340, subsymbolic encoder system 110 may search dictionary 140 for symbols matching the remaining subsymbolic elements of the vector. After applying the above function and/or removing the exponential component from the vector element, subsymbolic encoder system 110 may have generated a dictionary identification for each vector element. This dictionary identification may be a numeric value corresponding to a symbol and/or a word in dictionary 140. Table 7 illustrates an embodiment of symbols mapped to the extracted dictionary identification values determined from Table 6.

At 350, subsymbolic encoder system 110 may generate a symbolic arrangement of the vector using the symbols and the calculated positions of the symbols. Based on these symbols, subsymbolic encoder system 110 may recreate a tuple and/or a symbol graph representing the received subsymbolic data. The tuple and/or symbol graph may include a particular arrangement of symbols based on the ranking of subsymbolic elements and/or based on the exponential components of the vector. In an embodiment, subsymbolic encoder system 110 may generate the sentence "Create payment request for indebted customer." In an embodiment, based on the ranking, ordering, and/or positioning of the vector elements determined by subsymbolic encoder system 110 at 330, subsymbolic encoder system 110 may arrange the vector elements in a semantic or syntactic arrangement provided by subsymbolic intelligence system 160. In this manner, at 350, when subsymbolic encoder system 110 generates a symbolic arrangement, subsymbolic encoder system 110 may have already arranged the symbols into the semantic arrangement provided by subsymbolic intelligence system 160. At 350, subsymbolic encoder system 110 may then generate the symbolic graph representation by arranging the symbols based on the calculated positions of the symbols.

After generating the symbolic arrangement, subsymbolic encoder system 110 may transmit the symbolic arrangement in the designated semantic arrangement to symbolic intelligence system 150.

Figure 4:
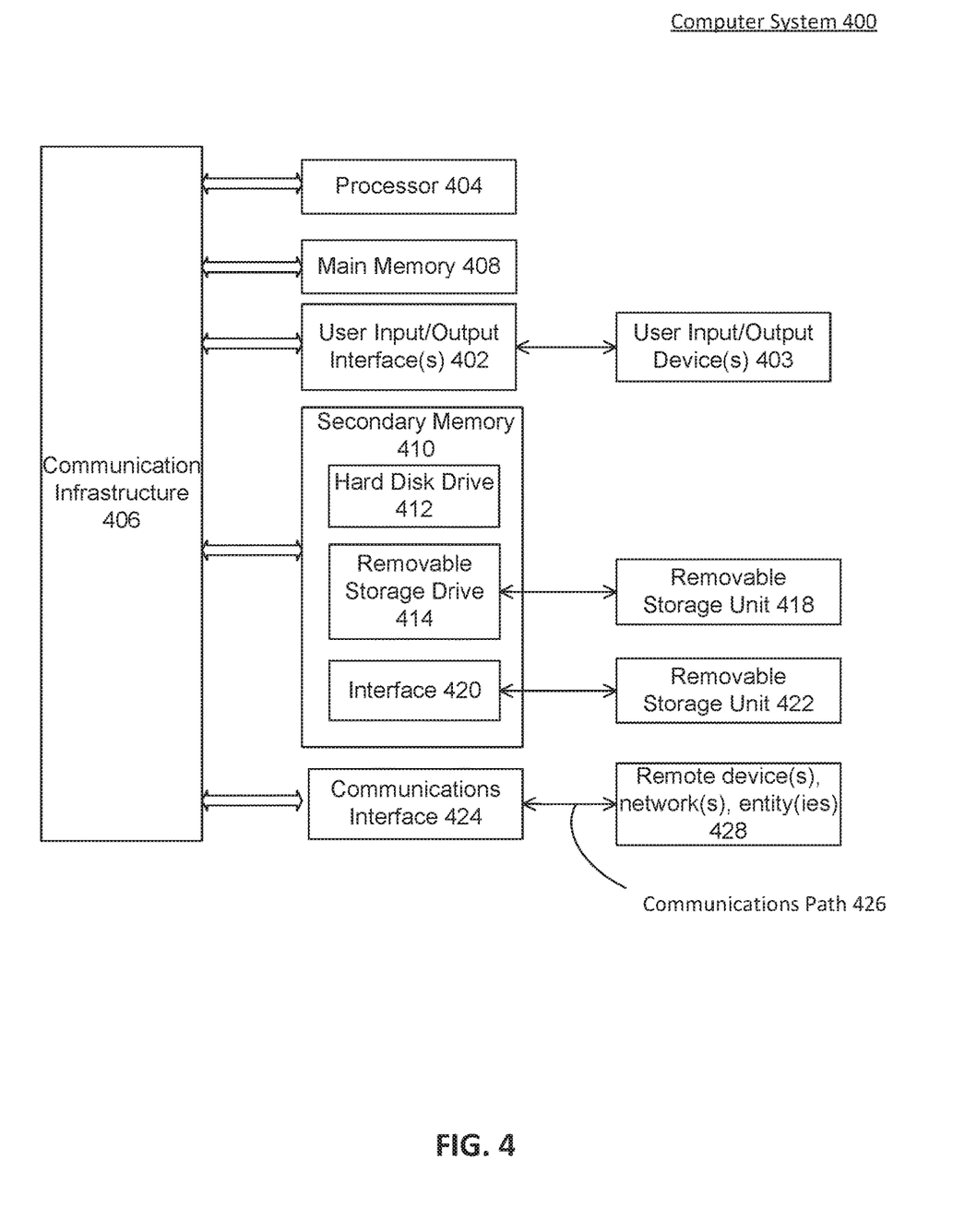
FIG. 4 depicts an example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   receiving a symbolic graph comprising a node;
   retrieving a dictionary identification for the node of the symbolic graph;
   calculating a subsymbolic value for the node of the symbolic graph using the dictionary identification corresponding to the node of the symbolic graph and an exponential component, wherein the calculating the subsymbolic value comprises adding a numerical value of the dictionary identification to a numerical value of the exponential component; and
   generating a vector including the subsymbolic value calculated for the node of the symbolic graph.

2. The computer-implemented method of claim 1, wherein calculating the subsymbolic value for the node of the symbolic graph further comprises:
   generating the exponential component using a number representative of a quantity of nodes of the symbolic graph.

3. The computer-implemented method of claim 1, wherein calculating the subsymbolic value for the node of the symbolic graph further comprises:
   generating the exponential component for the node of the symbolic graph by exponentially multiplying a value of a position in the symbolic graph of the node of the symbolic graph, by a number representative of a quantity of nodes of the symbolic graph.

4. The computer-implemented method of claim 1, wherein generating the vector further comprises:
   combining the subsymbolic value with other subsymbolic values corresponding to other nodes of the symbolic graph; and
   standardizing a length of the vector based on a length of the subsymbolic value.

5. The computer-implemented method of claim 1, further comprising:
   combining a weighted relationship indicator with the subsymbolic value.

6. The computer-implemented method of claim 1, further comprising:
   receiving a second subsymbolic value;
   removing a second exponential component from the second subsymbolic value to determine a second dictionary identification corresponding to the second subsymbolic value; and
   retrieving a symbol corresponding to the second dictionary identification.

7. The computer-implemented method of claim 1, further comprising:
   applying a function to the vector, to yield a corresponding dictionary identification for each of a plurality of elements of the vector;
   ranking the plurality of elements, based at least in part on subsymbolic values corresponding to other nodes of the symbolic graph, to determine a semantic arrangement of the one or more elements; and
   generating a sentence, based at least in part on the semantic arrangement.

8. A system, comprising:
   a memory; and
   at least one processor coupled to the memory and configured to perform operations comprising:
      receive a symbolic graph comprising a node;
      retrieve a dictionary identification for the node of the symbolic graph;
      calculate a subsymbolic value for the node of the symbolic graph using the dictionary identification corresponding to the node of the symbolic graph and an exponential component, wherein to calculate the subsymbolic value, the operations further comprise:
         add a numerical value of the dictionary identification to a numerical value of the exponential component; and
      generate a vector including the subsymbolic value calculated for the node of the symbolic graph.

9. The system of claim 8, wherein to calculate the sub symbolic value for the node of the symbolic graph, the at least one processor is further configured to:
  generate the exponential component using a number representative of a quantity of nodes of the symbolic graph.

10. The system of claim 8, wherein to calculate the subsymbolic value for the node of the symbolic graph, the at least one processor is further configured to:
  generate the exponential component for the node by exponentially multiplying a value of a position in the symbolic graph of the node of the symbolic graph, by a number representative of a quantity of nodes of the symbolic graph.

11. The system of claim 8, wherein to generate the vector, the at least one processor is further configured to:
  combine the subsymbolic value with other subsymbolic values corresponding to other nodes of the symbolic graph; and
  standardize a length of the vector based on a length of the subsymbolic value.

12. The system of claim 8, wherein the at least one processor is further configured to:
  combine a weighted relationship indicator with the subsymbolic value.

13. The system of claim 8, wherein the at least one processor is further configured to:
  receive a second subsymbolic value;
  remove a second exponential component from the second subsymbolic value to determine a second dictionary identification corresponding to the second subsymbolic value; and
  retrieve a symbol corresponding to the second dictionary identification.

14. A non-transitory computer-readable storage medium having instructions stored thereon that, when executed by at least one computing device, cause the at least one computing device to perform operations comprising:
  receiving a symbolic graph comprising a node;
  retrieving a dictionary identification for the node of the symbolic graph;
  calculating a subsymbolic value for the node of the symbolic graph using the dictionary identification corresponding to the node of the symbolic graph and an exponential component, wherein to calculate the subsymbolic value, the operations further comprise adding a numerical value of the dictionary identification to a numerical value of the exponential component; and
  generating a vector including the subsymbolic value calculated for the node of the symbolic graph.

15. The system of claim 8, wherein the at least one processor is further configured to:
  apply a function to the vector, to yield a corresponding dictionary identification for each of a plurality of elements of the vector;
  rank the plurality of elements, based at least in part on subsymbolic values corresponding to other nodes of the symbolic graph, to determine a semantic arrangement of the one or more elements; and
  generate a sentence, based at least in part on the semantic arrangement.

16. The non-transitory computer-readable storage medium of claim 14, wherein to calculate the subsymbolic value for the node of the symbolic graph, the operations further comprise:
  generating the exponential component for the node of the symbolic graph by exponentially multiplying a value of a position in the symbolic graph of the node of the symbolic graph, by a number representative of a quantity of nodes of the symbolic graph.

17. The non-transitory computer-readable storage medium of claim 14, wherein to generate the vector, the operations further comprise:
  combining the subsymbolic value with other subsymbolic values corresponding to other nodes of the symbolic graph; and
  standardizing a length of the vector based on a length of the subsymbolic value.

18. The non-transitory computer-readable storage medium of claim 14, the operations further comprising:
  combining a weighted relationship indicator with the subsymbolic value.

19. The non-transitory computer-readable storage medium of claim 14, the operations further comprising:
  receiving a second subsymbolic value;
  removing a second exponential component from the second subsymbolic value to determine a second dictionary identification corresponding to the second subsymbolic value; and
  retrieving a symbol corresponding to the second dictionary identification.

20. The non-transitory computer-readable storage medium of claim 14, the operations further comprising:
  applying a function to the vector, to yield a corresponding dictionary identification for each of a plurality of elements of the vector;
  ranking the plurality of elements, based at least in part on subsymbolic values corresponding to other nodes of the symbolic graph, to determine a semantic arrangement of the one or more elements; and
  generating a sentence, based at least in part on the semantic arrangement.

* * * * *